US011551428B2

(12) United States Patent
Li et al.

(10) Patent No.: US 11,551,428 B2
(45) Date of Patent: Jan. 10, 2023

(54) METHODS AND APPARATUS TO GENERATE PHOTO-REALISTIC THREE-DIMENSIONAL MODELS OF A PHOTOGRAPHED ENVIRONMENT

(71) Applicant: Intel Corporation, Santa Clara, CA (US)

(72) Inventors: Wenlong Li, Beijing (CN); Yuri Shpalensky, Givataim (IL); Alex Gendelman, Givatayim (IL); Maria Bortman, Ashkelon (IL); Asaf Shiloni, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/734,486

(22) PCT Filed: Sep. 28, 2018

(86) PCT No.: PCT/CN2018/108400
§ 371 (c)(1),
(2) Date: Dec. 2, 2020

(87) PCT Pub. No.: WO2020/062053
PCT Pub. Date: Apr. 2, 2020

(65) Prior Publication Data
US 2021/0233326 A1 Jul. 29, 2021

(51) Int. Cl.
*G06T 19/20* (2011.01)
*G06T 17/00* (2006.01)
(Continued)

(52) U.S. Cl.
CPC ............... *G06T 19/20* (2013.01); *G06T 7/70* (2017.01); *G06T 7/74* (2017.01); *G06T 17/00* (2013.01);
(Continued)

(58) Field of Classification Search
CPC ........... G06T 17/00; G06T 7/70; G06T 19/20; G06T 2207/20081
See application file for complete search history.

(56) References Cited

U.S. PATENT DOCUMENTS

| 2007/0269120 | A1 | 11/2007 | Thiems | |
| 2011/0043613 | A1* | 2/2011 | Rohaly | A61C 13/0004 348/50 |

(Continued)

FOREIGN PATENT DOCUMENTS

| CN | 1426527 | 6/2003 |
| CN | 108369742 | 8/2018 |
| CN | 108388850 | 8/2018 |

OTHER PUBLICATIONS

International Searching Authority, "International Search Report," issued in connection with international application No. PCT/CN2018/108400, dated Jun. 28, 2019, 4 pages.

(Continued)

*Primary Examiner* — Matthew Salvucci
(74) *Attorney, Agent, or Firm* — Hanley, Flight & Zimmerman, LLC

(57) ABSTRACT

Methods and apparatus to generate photo-realistic three-dimensional models of a photographed environment are disclosed. An apparatus includes an object position calculator to determine a three-dimensional (3D) position of an object detected within a first image of an environment and within a second image of the environment. The apparatus further includes a 3D model generator to generate a 3D model of the environment based on the first image and the second image. The apparatus also includes a model integrity analyzer to detect a difference between the 3D position of the object and the 3D model. The 3D model generator (Continued)

automatically modifies the 3D model based on the difference in response to the difference satisfying a confidence threshold.

19 Claims, 10 Drawing Sheets

(51) Int. Cl.
  *G06T 7/70* (2017.01)
  *G06T 7/73* (2017.01)
(52) U.S. Cl.
  CPC .............. *G06T 2207/20081* (2013.01); *G06T 2207/30196* (2013.01); *G06T 2207/30221* (2013.01); *G06T 2219/2012* (2013.01)

(56) References Cited

U.S. PATENT DOCUMENTS

| | | | | |
|---|---|---|---|---|
| 2016/0065912 | A1* | 3/2016 | Peterson | G01N 21/8806 348/86 |
| 2018/0047208 | A1* | 2/2018 | Marin | H04N 13/243 |
| 2018/0114363 | A1* | 4/2018 | Rosenbaum | G06T 17/20 |
| 2018/0218507 | A1* | 8/2018 | Hyllus | G06T 7/344 |
| 2019/0096135 | A1* | 3/2019 | Dal Mutto | G06T 7/11 |

OTHER PUBLICATIONS

International Searching Authority, "Written Opinion," issued in connection with international application No. PCT/CN2018/108400, dated Jun. 28, 2019, 3 pages.

Yamada Kentaro et al: "Occlusion robust free-viewpoint video synthesis based on inter-camera/-frame interpolation", 2013 IEEE International Conference on Image Processing, IEEE, Sep. 15, 2013, 5 pages.

Takayoshi Koyama et al: "Live 3D video in soccer stadium", ACM, Jul. 27, 2003, 1 page.

Rematas Konstantinos et al: "Soccer on Your Tabletop", 2018 IEEE/CVF Conference on Computer Vision and Pattern Recognition, IEFF, Jun. 18, 2018, 10 pages.

European Patent Office: "Extended Search Report" mailed in connection with corresponding European Patent Application No. 18934603.4 dated Apr. 5, 2022 (9 pages).

Indian Patent Office, "First Examination Report," issued in connection with IN Patent Application No. 202047052472, dated Nov. 3, 2022, 7 pages. English translation included.

* cited by examiner

US 11,551,428 B2

METHODS AND APPARATUS TO GENERATE PHOTO-REALISTIC THREE-DIMENSIONAL MODELS OF A PHOTOGRAPHED ENVIRONMENT

RELATED APPLICATIONS

This patent claims priority to International PCT Application No. PCT/CN2018/108400, which was filed on Sep. 28, 2018, and which is hereby incorporated herein by reference in its entirety.

FIELD OF THE DISCLOSURE

This disclosure relates generally to model generation, and, more particularly, to methods and apparatus to generate photo-realistic three-dimensional models of a photographed environment.

BACKGROUND

Replay footage of sporting events can now be generated wherein the footage can be rotated 360 degrees to provide a view of a play from virtually any angle. To enable such 360 degree viewing, image data from multiple video feeds of the sporting event taken at different angles are combined to generate a three-dimensional (3D) model or reconstruction of the sporting event. With a 3D model generated in this manner, a virtual camera can be placed at any location within the model and face any direction to define a certain perspective that can be rendered for display.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
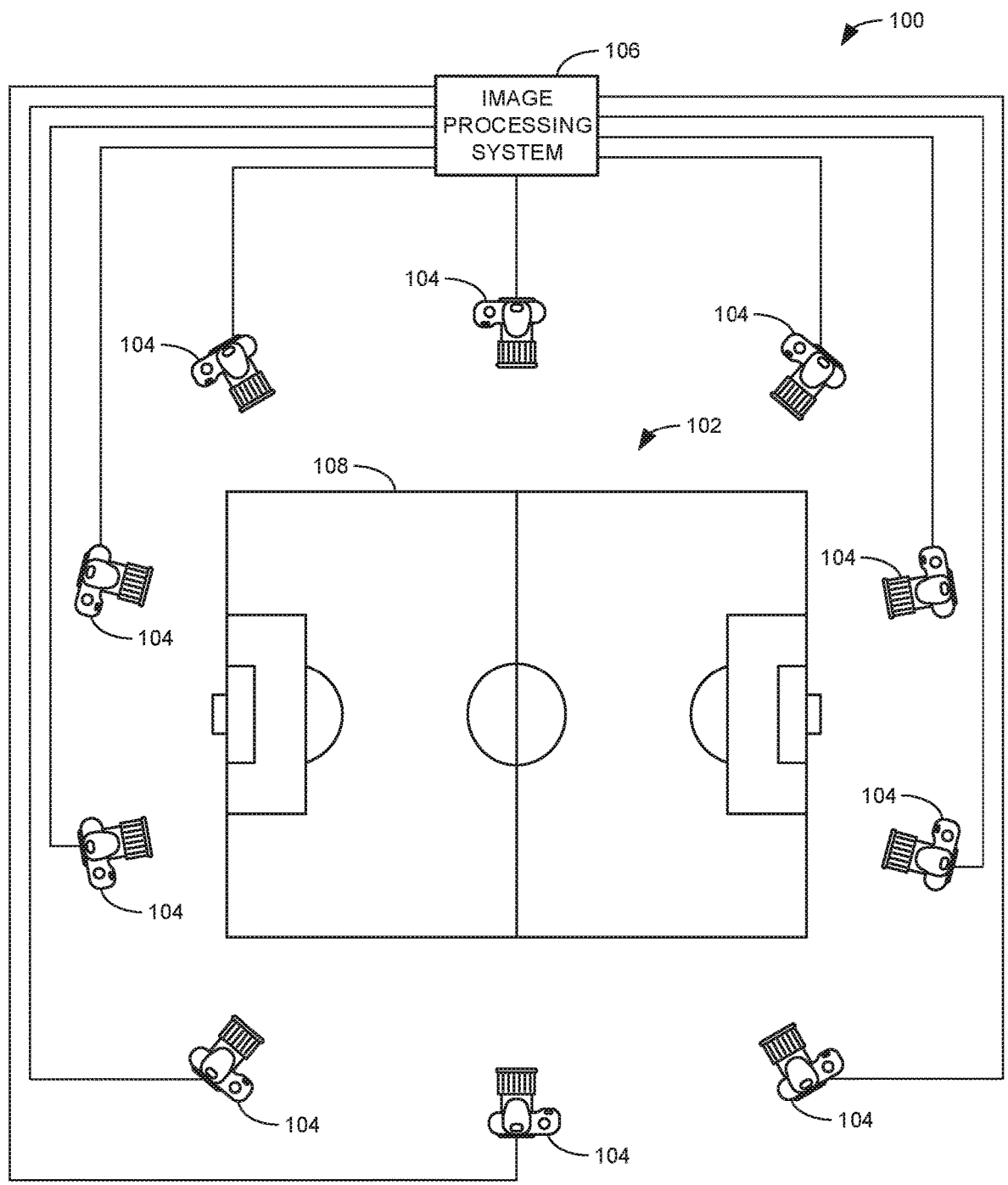
FIG. 1 illustrates a known system to generate a 3D model of an environment.

FIG. 1 illustrates a known system 100 to generate a 3D model of an environment 102. As shown in FIG. 1, the system 100 includes a plurality of cameras 104 positioned at different locations around a target environment 102 to capture high resolution images (still photographs and/or frames of a video feed) of the environment 102 from different angles. In FIG. 1, the images from each of the cameras 104 are provided to a central image processing system 106 for further processing as described further below. Examples disclosed herein provide an improvement to the system 100 based on an image processing system 600 (shown in FIG. 6) constructed and implemented in accordance with teachings disclosed herein that overcomes limitations of the image processing system 106 of FIG. 1. For purposes of discussion, the environment 102 includes a soccer field 108. However, the environment 102 may alternatively correspond to other types of event, political rallies, theatrical performances, concerts, arenas or playing fields (e.g., baseball field, basketball court, football field, hockey rink, tennis court, etc.). Thus, while examples discussed herein are provided in the context of sporting events, the system 100 may be implemented in other types of environments and/or associated with other types of events unrelated to sports such as, for example, concert halls, convention centers, public squares, and/or any other suitable location (whether indoors or outdoors) where cameras are able to capture images from different angles.

While ten different cameras 104 are shown in FIG. 1, the system 100 may include any suitable number of cameras 104 placed at any suitable locations. Thus, the particular placement of the cameras 104 shown in FIG. 1 (e.g., evenly distributed circumferentially around the environment 102) is by way of example only and other arrangements are possible. In some examples, at least some of the cameras 104 may be positioned and configured to capture all or substantially all of the target environment 102 within their corresponding field of view. In some examples, at least some of the cameras 104 may be positioned and/or configured to capture less than all of the target environment 102 within their corresponding field of view. For example, a first camera 104 may have a field of view limited to a first end of the soccer field, a second camera 104 may have a field of view limited to the opposite end of the soccer field, and a third camera 104 may have a field of view that takes in the entire environment 102. In some examples, all of the cameras 104 may have a field of view limited to a particular portion of the environment 102. In other examples, all of the cameras 104 may have a field of view that captures the entirety of the environment 102. Further, the cameras 104 may be placed at any suitable elevation relative to the target environment 102 as well as at any suitable distance therefrom. For example, some cameras 104 may be placed relatively low to the ground and close to the environment 102 (e.g., near the sidelines of the playing field), while other cameras 104 are placed higher and farther away (e.g., above the bleachers in a stadium). In some examples, some of the cameras 104 may be suspended above the environment 102 to capture an overhead perspective.

In some examples, the placement of each camera 104 relative to the environment 102 is fixed. As a result, each camera 104 can be precisely calibrated for its unique position relative to the environment 102 to assist processing the image data produced by the corresponding camera. In particular, once placed in its designated position, each camera 104 undergoes a camera calibration process (sometimes referred to as camera resectioning) to generate a calibration matrix for the camera. A calibration matrix defines both intrinsic and extrinsic parameters for a camera to enable the mapping of two-dimensional points in an image taken by the camera (e.g., individual image pixels) to three-dimensional (3D) points within the 3D space of the real-world scene captured in the image (e.g., 3D points within the real-world environment 102). In some instances, the cameras 104 may undergo subsequent calibration processes to adjust for any minor movements of the camera over the course of time (e.g., due to wind, the camera being bumped or jostled by a bird or other object coming in contact with the camera 104 and/or its support structure, etc.). In this manner, the location of the cameras 104 relative the environment (and the corresponding calibration matrices) are precise and accurate. In some instances, one or more of the cameras 104 may be able to move relative to the move relative to the environment 102. In such instances, the calibration matrix for the corresponding moving camera 104 may be updated in substantially real-time as the camera moves.

Based on the pixel information associated with images captured by the different cameras 104 and the corresponding calibration matrices for the cameras 104, the image processing system 106 of FIG. 1 generates a photo-realistic 3D model of the environment 102. When the environment 102 includes moving objects (e.g., players running on a soccer field), different images captured from different angles need to be captured at the same point in time to enable their proper combination into a 3D model that includes the moving objects. Accordingly, in some examples, the cameras 104 are synchronized so that images captured at the same time can be matched together for the 3D model generation.

More particularly, generating a 3D model of the environment 102 may include applying a binarization process to the synchronously captured images (e.g., to each of the images). Binarization is implemented to facilitate the segmentation of the images so that the pixels in an image (e.g., each pixel) may be identified or classified as corresponding either to a background or to objects in the foreground. In some examples, the segmentation process to identify background and foreground pixels may be implemented without performing the binarization process on the images. In the context of a sporting event, objects in the background may include the playing field, spectators and/or other individuals surrounding the playing field, etc. Objects in the foreground at a sporting event may include participants on or adjacent to the playing field (players, referees, umpires, coaches, sports announcers, etc.), sports equipment (e.g., balls, goal posts, nets, pucks, rackets, helmets, etc.), and/or anything else that may be within the environment 102 at the time the images are captured.

Although images captured by different cameras 104 contain overlapping content associated with the environment 102, the content represented in images from different cameras 104 is different because the cameras 104 capture the images from different angles. With the precise location of the cameras 104 relative to the environment 102 and the respective calibration matrices for the cameras 104 being known, the example image processing system 106 analyzes the segmented images to generate or construct a 3D point cloud or volumetric model of the environment 102. Once the 3D point cloud is generated, the image processing system 106 generates a final 3D model of the environment 102 by painting, texturing, or coloring the 3D point cloud based on color information associated with the pixels in the images captured by the cameras 104. Because this color information corresponds to actual images of the real-world environment 102, the resulting 3D model is photo-realistic.

In some examples, the image processing system 106 repeats the above process for additional images captured by the cameras 104 at a later point in time. For example, the additional images may correspond to subsequent frames in a video stream being captured by the cameras 104 at any suitable framerate (e.g., 30 frames per second). In this manner, examples disclosed herein generate a photo-realistic 3D model of the environment 102 that changes in time with changes in the real-world environment. As a result, the scene captured in the environment 102 may be rendered from the perspective of a virtual camera that is placed at any desired location within the 3D model and/or that follows any desired path through the 3D model.

Generating and/or rendering a photo-realistic 3D model as disclosed herein is a computationally intensive technological process that involves many technical components working together. For example, the cameras 104 are precisely placed and calibrated for their particular locations relative to the environment. Further, the cameras 104 are synchronized so that images captured by different ones of the cameras occur at the same time and can be matched together by the image processing system 106. Additionally, in the context of live sporting events, audience members typically expect to view replays within a relatively short time period following the actual event. Accordingly, to generate 3D replays within a timeframe that enhances viewers' experiences, the image processing system 106 has the computational capacity to process large amounts of data in a very short period of time (as much as terabytes of data every minute). Accordingly, while the image processing system 106 is shown as a single block in FIG. 1, the image processing system 106 may be implemented using multiple processors and/or servers that may either be centrally located or distributed around the environment 102 similar to the cameras 104. In some examples, the image processing system 106 includes a central processing system to collect image data from multiple remote processors associated with individual ones of the cameras 104. In such examples, the remote processors may perform initial processing of the captured images before the image data is transmitted to the central processing system for consolidation to generate the 3D model.

The process described above is still subject to certain technological challenges. For instance, the processes of binarization and segmentation of captured images followed by the 3D reconstruction, as described above, is not always accurate. For example, depending on the thresholds used for the segmentation, pixels of an image that should be classified as corresponding to an object in the foreground may incorrectly be classified as background (e.g., a false negative). Conversely, pixels of an image that should be classified as corresponding to the background may incorrectly be classified as being associated with an object in the foreground (e.g., a false positive). One reason for these errors in the context of sporting events is the fast movement of objects within the environment 102, such as players running down a field. Because players are often running up or down a field, their legs, arms, and/or other portions of their bodies may appear somewhat blurred within the captured images. As such, the segmentation process may not be able to determine the precise contours of the player's bodies in certain images.

Figure 2:
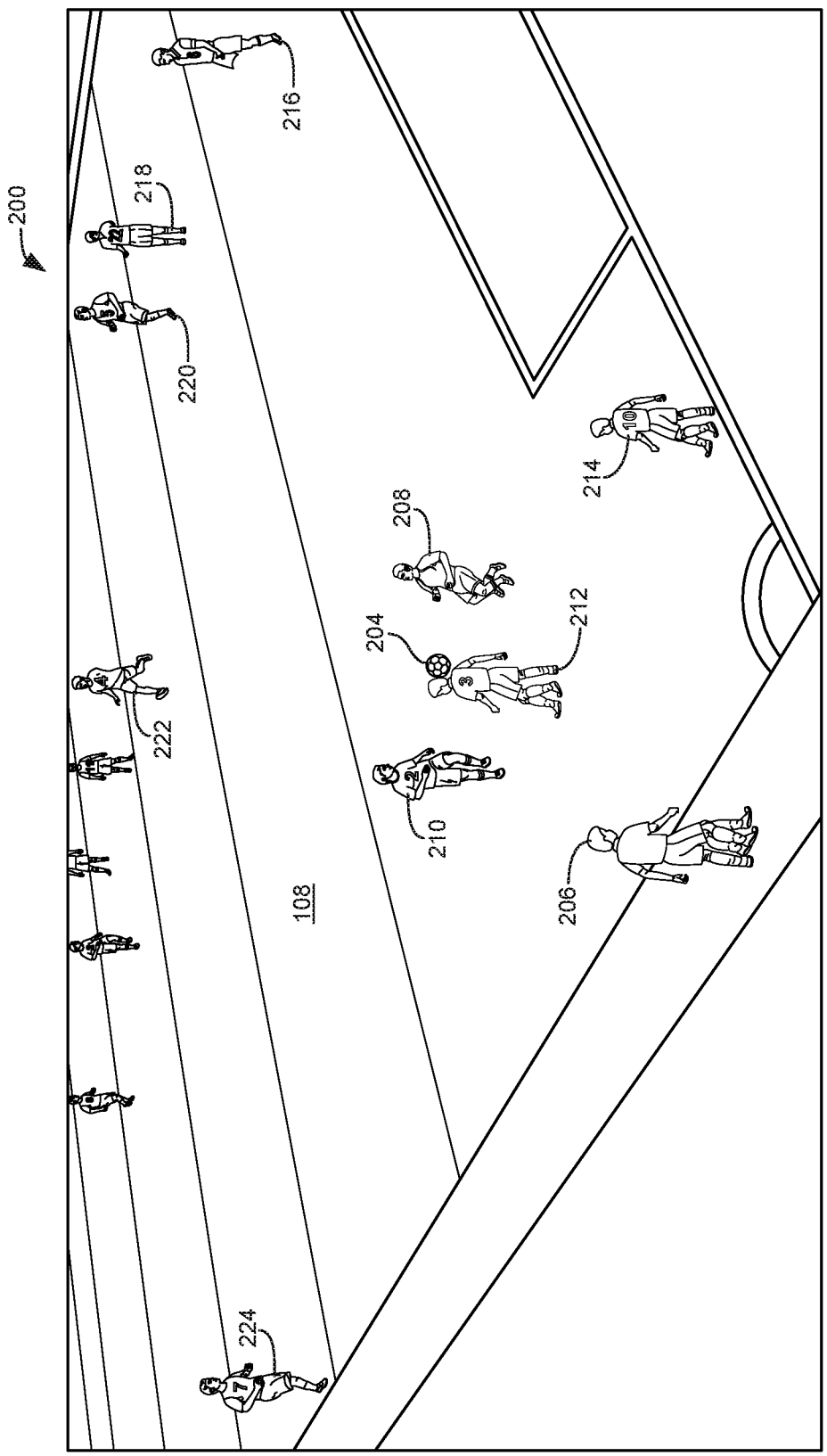
FIG. 2 illustrates a view of a 3D model of the environment of FIG. 1.

As a result of the imperfect segmentation process, when the images from different cameras are combined to construct a 3D model of the environment 102, the rendering of the players may miss portions of their bodies as shown in the example of FIG. 2. FIG. 2 illustrates a view of an example 3D model 200 of the environment 102 of FIG. 1 generated by the image processing system 100 of FIG. 1 during a soccer game. In the illustrated example, the background includes the soccer field 108 of FIG. 1 with objects in the foreground including a soccer ball 204, a referee 206, and a plurality of players (some of which are identified by reference numerals 208, 210, 212, 124, 216, 218, 220, 222, 224).

In the illustrated example of FIG. 2, the players identified by reference numerals 216, 220, and 224 are missing a leg because their legs were not properly identified in the segmentation process. As a result, the legs of these players were not constructed in the 3D point cloud for the environment 102. Thus, when the final stage of texturing or coloring the 3D point cloud is performed to produce the rendered 3D model 200 as shown in FIG. 2, color pixel information from the images corresponding to the background (e.g., the soccer field 108) was used instead of pixels associated with the foreground (e.g., the missing leg). For the same reasons, the players identified by reference numerals 218 and 222 are missing an arm.

While some errors in the segmentation process may lead to missing portions of players (or other objects) in the 3D model 200, other errors may result in a final rendering of the 3D model 200 that introduces duplicative portions of a player (or other object). For instance, in the example 3D model 200 of FIG. 2, the referee 206 and the players identified by reference numerals 208, 212, 214 appear to have more than two legs. This problem may arise because the image processing system 106 is unable to correctly resolve the images from different angles when constructing the 3D point cloud of the environment 102 such that the same portion of a player, as captured from different cameras 104 at different angles, results in multiple separate volumetric structures within the 3D model. Other types of aberrations in the 3D model corresponding to a detected object may similarly be characterized as portions of the object missing from the model and/or duplicative in the model. For example, a player may properly have two legs in a 3D model but one of the legs is incorrectly generated in the model to be much longer than the other leg. In this example, while the 3D model does not include an extra leg for the player, the extra length of the leg may nevertheless be referred to as a duplicative portion of the player's actual leg and, thus, treated in a similar manner as disclosed herein. As another example, there may be instances where a player's leg (or any other portion of their body) represented within the 3D model is incorrectly placed relative to the rest of the player's body (e.g., the leg is detached and spaced apart from the body and/or the leg is in a position and/or has a shape that is physically impossible (unless the player's leg is broken)). In some such examples, the improperly placed/shaped leg may be treated as duplicative to a properly placed/shaped leg that is itself missing from the 3D model. Thus, as used herein, missing portions and duplicative portions of an object in a 3D model may occur simultaneously for and be combined in suitable manners to characterize any sort of aberration to the shape, size, position, etc., of an object detected from captured images.

While the example 3D model 200 of FIG. 2 properly renders the ball 204, in many instances, the issues of incorrectly rendering players (or other participants) at a sporting event identified above are more prevalent for a ball 204. The problems noted above are often exacerbated for the ball 204 because it is smaller than the players and often moves faster than players such that it is even more likely to appear as a blurred streak in particular images captured by the cameras 104, thereby making it difficult for the segmentation process to properly identify the ball. Furthermore, the ball 204 may fly into the air such that, from the view point of the cameras 104, the background behind the ball 204 is the crowd of spectators. When the ball 204 occludes the crowd in this manner it is even more difficult to isolate the ball and identify it as being in the foreground with the audience surrounding it in the background using segmentation due to the colors and variation in the crowd. Thus, it is often the case that the ball 204 is completely lost within particular images captured by the cameras 104. That is, in many instances, not merely a portion of the ball 204 is missing but the entire ball 204 may not appear in the 3D point cloud constructed from the segmented images. Being able to locate the ball 204 while watching a sporting event is important to audience members. To reduce the likelihood that the ball 204 is not identified, the thresholds for the segmentation are set relatively low. While this may increase the chances of identifying the ball 204, it increases the likelihood of false positives as described above. Thus, known approaches produce 3D models with missing objects (or portions thereof) and/or introduce duplicative portions of objects. In such situations, operators need to manually edit the rendered images to add missing content and/or remove duplicate content.

Examples disclosed herein reduce errors caused by the segmentation process described above. Examples disclosed herein enable the automatic correction of errors that may occur by determining the 3D position of objects (e.g., a ball, players, etc.) within the real-world environment 102 independent of the segmentation process and using the independently calculated 3D position to confirm or correct the 3D model generated from the segmentation process. That is, in accordance with teachings disclosed herein, the known system 100 of FIG. 1 may be modified by implementing the example image processing system 600 of FIG. 6 in place of the known image processing system of FIG. 1 to improve 3D models generated based on images from the cameras 104.

Figure 3:
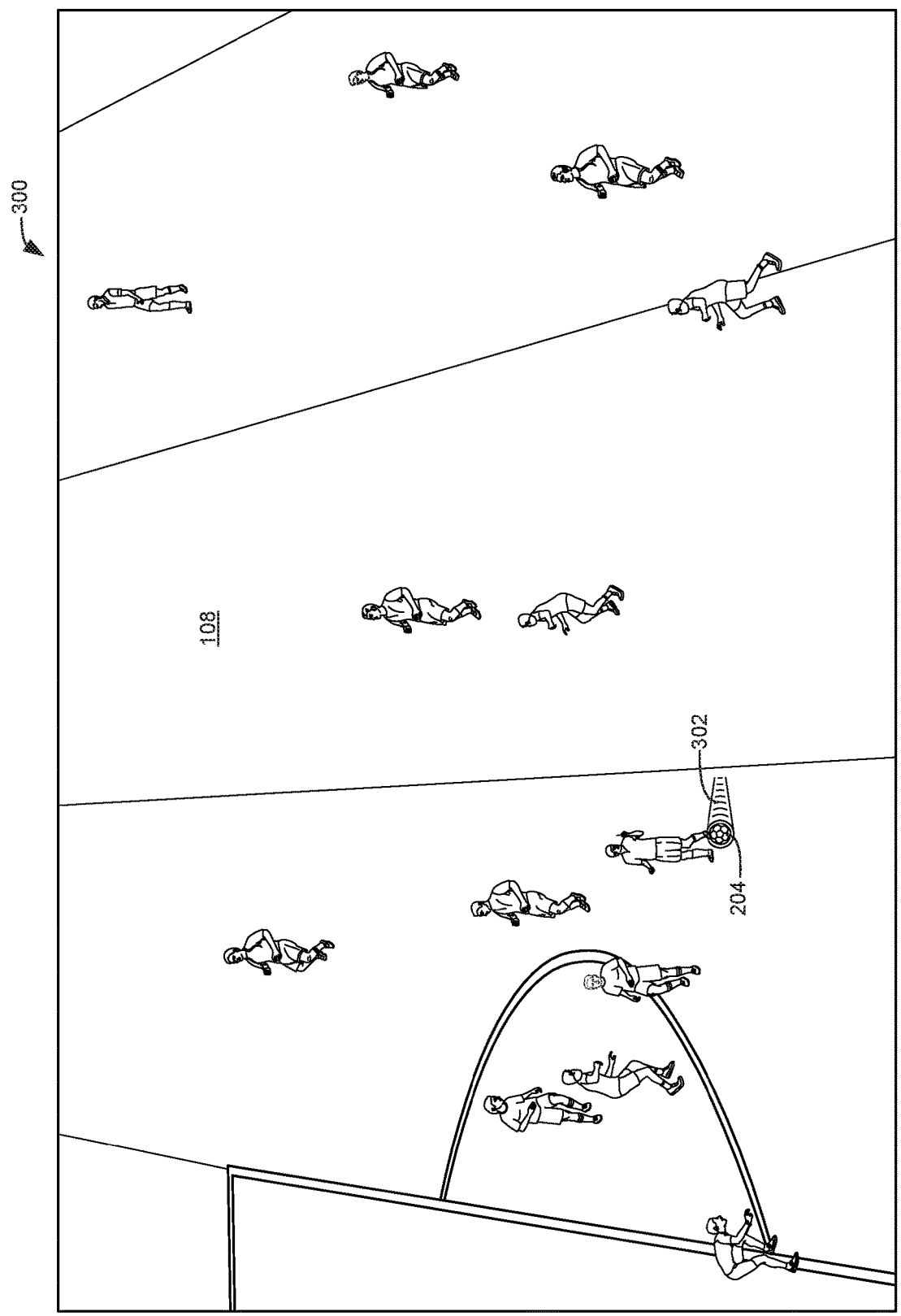
FIG. 3 illustrates an image of a portion of the environment of FIG. 1 in which a ball in the environment is being tracked.

In some examples, the image processing system 600 performs image analysis on the images based on deep learning object detection models to identify relevant objects within the scene captured by each image. For example, FIG. 3 illustrates an example image 300 of a portion of the soccer field 108 in the environment 102 of FIG. 1 taken by one of the cameras 104. The image 300 of FIG. 3 includes a ball trail 302 representative of an artificial intelligence (AI) object detection engine of the image processing system 600 using a deep learning ball detection model to detect and track the location of the soccer ball 204. The ball trail 302 is shown for purposes of discussion and, thus, in some examples, may not be generated by the AI engine when tracking the ball 204. More particularly, the ball trail 302 is intended to represent that the AI engine can follow a path of the ball between successive images in a video stream to predict the location of the ball 204 in subsequent images to more accurately identify its location within an image, even if it flies into the air and becomes occluded with an audience.

Figure 4:
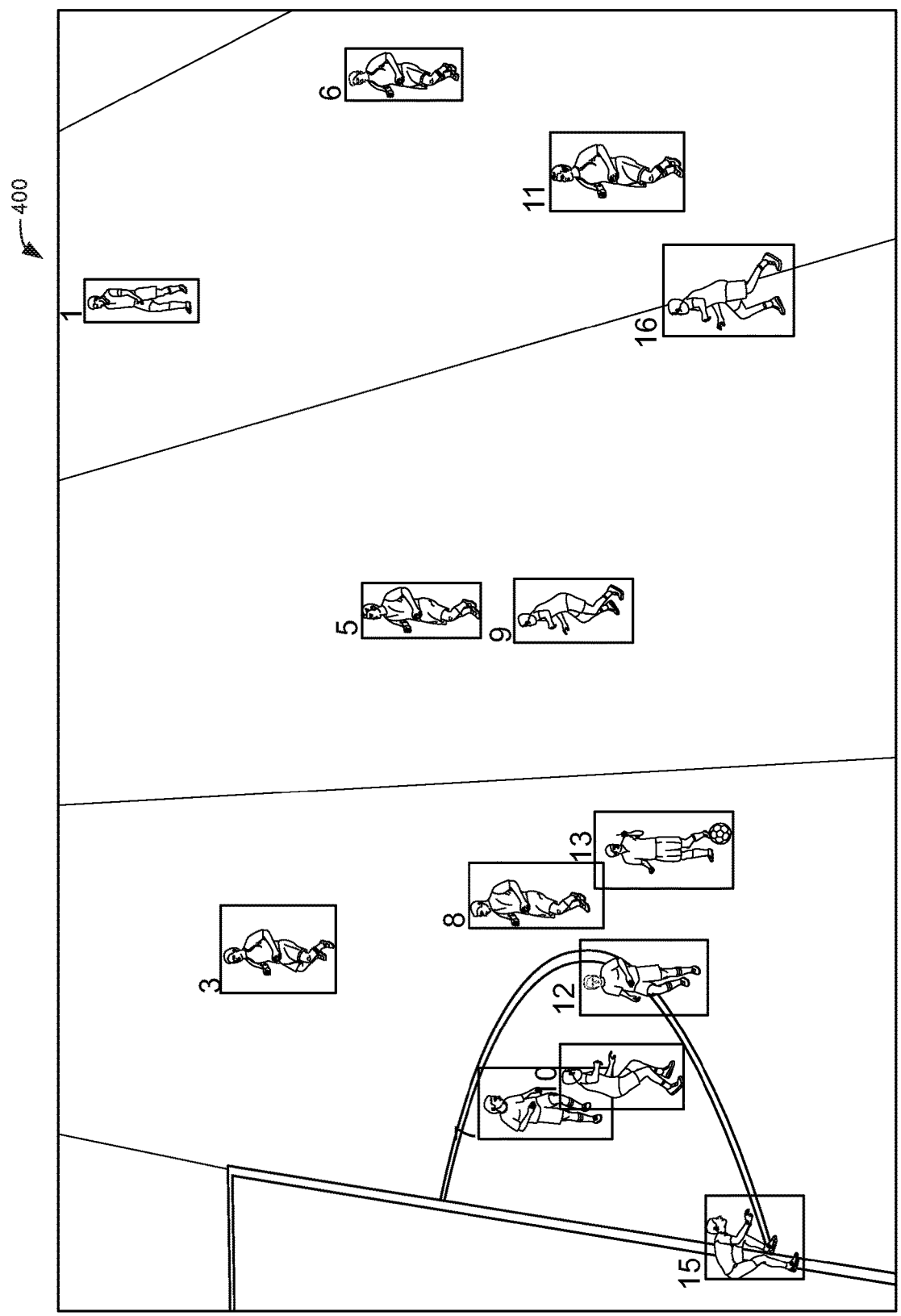
FIG. 4 illustrates an image of a portion of the environment of FIG. 1 in which people in the environment are being tracked.

As another example, FIG. 4 illustrates an example image 400 of a portion of the soccer field 108 in the environment 102 of FIG. 1 taken by one of the cameras 104. FIG. 4 demonstrates an AI-based object detection engine as disclosed herein identifying the players on the soccer field 108 using a suitable deep learning human detection model. In some examples, the detection model enables the AI engine to distinguish one player from another so that the location of specific players (as represented in FIG. 4 by the player number above the box surrounding each player) may be tracked over time.

Once the location of a relevant object (ball, player, etc.) is detected within the 2D images captured by the cameras 104, the corresponding 3D position of the object within the 3D space of the real-world environment 102 may be calculated based on the calibration matrices for the corresponding cameras 104. As used herein, the 3D position of an object detected within an image (or a set of images synchronously captured from multiple different cameras) may include different factors. Such factors may include at least one of the location or placement of the object within the 3D space of the real-world environment 102, the orientation of the object within the 3D space, and/or the shape of the object within the 3D space. The placement of the object may be defined by a point within a coordinate system (e.g., X, Y, and Z coordinates) relative to a reference point. The orientation of the object may be defined by angles of rotation about the axes of the coordinate system (e.g., X, Y, and Z axes) and/or about the axes of a local coordinate system defined for the object. The shape of the object may be defined in any suitable manner to specify the particular form, size, and/or configuration of the object. In some examples, the orientation and/or the shape of the object may be unnecessary to adequately define the 3D position of an object and, thus, may be omitted from the analysis. For instance, a soccer ball is spherical and has a fixed shape such that defining its coordinates (e.g., a center point of the ball) may be sufficient to fully define its 3D position. By contrast, coordinates for the center point of a football do not fully define the 3D position of the football because it is oblong such that it may have different rotational orientations about its center.

Figure 5:
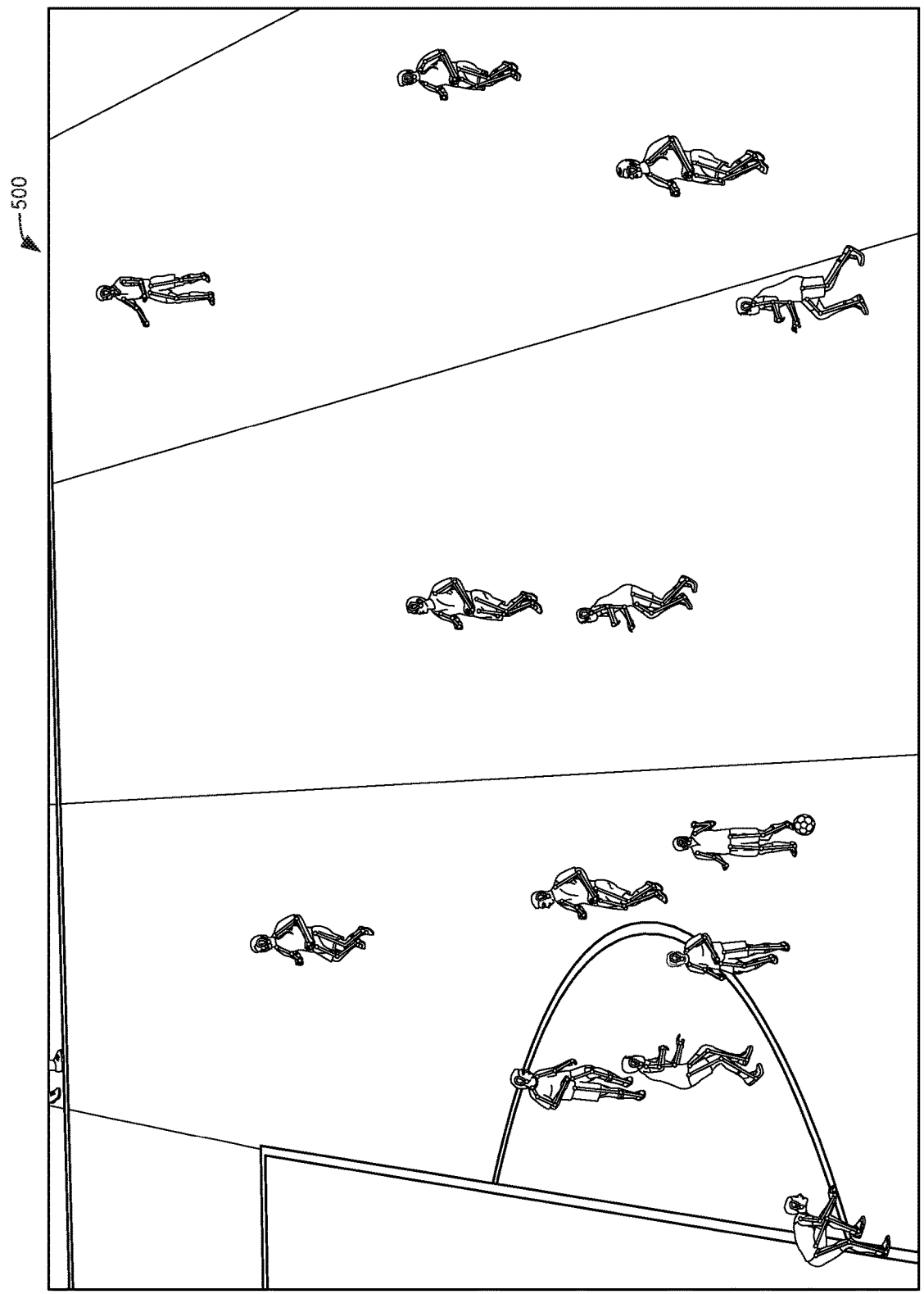
FIG. 5 illustrates an image of a portion of the environment of FIG. 1 in which the skeletal forms of people in the environment are being tracked.

The shape factor of the 3D position of an object is relevant for objects that are capable of changing size, form, configuration, etc. For example, humans can change in shape in that individual portions of the body (e.g., arms, legs, head, etc.) may be positioned differently with respect to one another. In some examples, the shape or pose of a human, such as a soccer player on the field 108 may be detected and defined by an AI-based object detection engine using a deep learning skeleton or human pose model. In such examples, in addition to identifying and distinguishing the players, as represented in FIG. 4, the AI engine also detects the joints of each player and their relative position to one another as represented in the image 500 of FIG. 5. Thus, when the image processing system 600 determines the 3D position of a human within the 3D space of the real-world environment 102 based on an analysis of captured images, the image processing system 600 may calculate the human's placement (e.g., coordinates relative to a reference), orientation (e.g., angles of rotation relative to a reference), and/or the human's shape (e.g., skeletal form or pose).

In accordance with teachings disclosed herein, the image processing system 600 employs the real-world 3D positions of objects calculated based on the 2D locations of the objects detected within images captured by the cameras 104 to confirm the accuracy of, and/or correct errors in, a 3D model of the environment 102 generated using the segmentation process described above. That is, in some examples, the image processing system 600 still performs the segmentation process on the images (similar to known systems) to identify pixels associated with objects in the foreground and then uses that data to construct a 3D point cloud that is subsequently colored using color pixel information from the original camera images. As described above, such a process often results in missing body parts of players (or other objects), duplicate body parts of players (or other objects), and, in some cases, the ball missing entirely from the 3D model.

Errors in the 3D model that may need to be corrected are identified by comparing the 3D model to the real-world 3D positions calculated for the objects detected in the images to identify discrepancies or differences. Once differences between the 3D model and the calculated 3D positions of objects are identified, the image processing system 600 of this example determines whether the difference corresponds to an error in the 3D model and then automatically corrects the error. As an example, assume that the image processing system 600 determines the 3D position of a ball (e.g., the ball 204 of FIG. 2) in the 3D space of the real-world environment 102 based on the deep learning object detection model to be at particular X, Y, and Z coordinates (e.g., the placement of the ball within the real world). Further assume that the region within the 3D model of the environment 102 corresponding to the particular X, Y, and Z coordinates does not include any object. In this scenario the image processing system 600 determines the that ball is missing from where it is supposed to be in the 3D model. Accordingly, the image processing system 600 of this example generates a point cloud representation of the ball based on a model of the ball and inserts the point cloud representation of the ball into the 3D model of the environment 102 at the particular X, Y, and Z location. Thereafter, the inserted point cloud representation of the ball may be textured or colored using the color pixel information from the original camera images used to initially calculate the 3D position of the ball. Thus, even though the ball was originally missing from the 3D model generated based on segmented images, the error is automatically (i.e., without human involvement, completely by machines) corrected. Furthermore, because the position of the ball is determined independent of the segmentation process, there is less of a need to use low thresholds in the process as used in previous approaches to ensure the ball is found. With the higher thresholds for the segmentation process enabled by examples disclosed herein, other objects larger than the ball (e.g., humans) are more likely to be properly identified thereby reducing other errors (e.g., false positives) that might otherwise appear when generating the 3D model of the environment 102.

In a similar manner to how a missing ball can be added to the 3D model of the environment 102, other missing objects or parts thereof may be automatically identified and corrected. For instance, in some examples, the image processing system 600 compares the calculated real-world 3D position of a person (including the shape of the person as defined by a skeletal or human pose model) to the region of the 3D model of the environment 102 corresponding to the coordinates of the person as defined by the calculated 3D position. Missing limbs and/or incorrectly generated duplicate limbs are identified by the image processing system 600 of this example by comparing what is represented in the 3D model with the skeletal shape (e.g., human pose) of the person. Further, using a model for a human, a point cloud representation of the missing portion of the human may be generated and inserted into the 3D model to then be textured or colored using color pixel information as mentioned above.

Inasmuch as the real-world 3D position of an object is determined independently of the process used to generate the 3D model of the environment 102 as explained above, it is unlikely that the calculated 3D position and the 3D model will exactly correspond. Accordingly, in some examples, minor differences between the calculated 3D position of an object and the corresponding region of the 3D model may be ignored. For instance, in some examples, the image processing system 600 may only correct an error when there is a level of certainty that there is, in fact, a discrepancy sufficient to satisfy a threshold. Where the difference between the calculated 3D position and the 3D model does not satisfy the threshold, the image processing system 600 may disregard the difference and leave the 3D model as initially generated. In some examples, the threshold may depend on the particular type of object being detected (e.g., ball versus person) and/or the particular type of error (e.g., false positive versus false negative).

Figure 6:
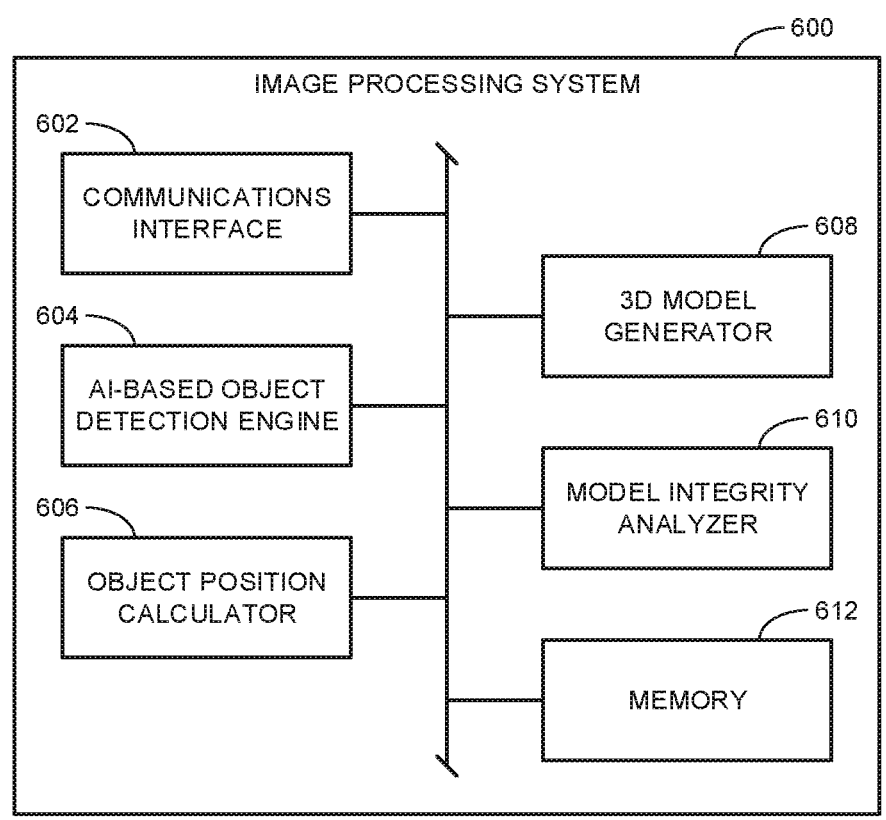
FIG. 6 is a block diagram illustrating an example image processing system constructed in accordance with teachings of this disclosure.

FIG. 6 is a block diagram illustrating an example implementation of the image processing system 600. As shown in the illustrated example, the image processing system 600 includes an example communications interface 602, an example AI-based object detection engine 604, an example object position calculator 606, an example 3D model generator 608, an example model integrity analyzer 610, and an example memory 612. In some examples, the image processing system 600 may be implemented by a single processor and/or by multiple processors and/or processor cores. In some examples, one or more of the structures shown in FIG. 6 are implemented by separate processors associated with individual ones of the cameras 104 while other structures are implemented at a central site to analyze the pre-processed data from the processors associated with the separate cameras 104. Moreover, one or more of the structures of FIG. 6 may be located remotely and accessed via a network and/or implemented by a virtual machine or container. With the possible different implementations understood, for purposes of discussion, except as otherwise noted, FIG. 6 will be described as a centrally located system separate from the cameras 104.

The example communications interface 602 of FIG. 6 serves to receive image data from the separate cameras 104. In some examples, the image data is raw data corresponding to original images captured by the cameras 104. In other examples, the image data includes the images captured by the cameras 104 after undergoing various pre-processing operations. In some examples, the communications interface 602 enables the transmission of a final 3D model of the environment to other remote entities for subsequent use (e.g., to broadcast 360 degree replays of a sporting event based on the 3D model).

The example AI-based object detection engine 604 of FIG. 6 analyzes the images of the environment 102 captured by the cameras 104 to detect and/or identify relevant objects within the environment. In the context of sporting events, relevant objects may include a player (or other person), a ball (or other sports equipment), and/or any other relevant content. In some examples, the objects are detected based on one or more deep learning object detection models. In some examples, different models are used for different types of objects. For instance, a first deep learning ball detection model may be tailored to detect a ball, a second deep learning human detection model may be tailored to detect one or more persons, and a third deep learning skeleton or human pose detection model may be tailored to detect the shape (e.g., bodily configuration) of one or more persons. In some examples, the image data corresponds to a video feed from the different cameras 104. Accordingly, in some examples, the deep learning object detection model(s) take into account the detection of relevant object(s) from previously analyzed frames of the video to identify the object(s) in a most recent frame being analyzed. In some examples, the AI-based object detection engine 604 is implemented by a processor associated with individual ones of the cameras such that the object detection analysis is performed locally to corresponding ones of the cameras 104 before the image data is transmitted to a central processing system.

The object position calculator 606 of the example of FIG. 6 determines the 3D position of objects within the real world (i.e., within the 3D space of the environment 102) based on their 2D position within one or more of the images captured by the cameras 104 using the calibration matrices of the corresponding cameras. As mentioned above, a calibration matrix of a camera defines the parameters for the camera that enable the mapping of 2D points in an image taken by the camera (e.g., individual image pixels) to 3D points within the 3D space of the real-world scene captured in the image. Thus, based on the 2D location of an object detected in an image by the AI-based object detection engine 604, the object position calculator 606 may sometimes estimate the 3D position of the detected object using the calibration matrix for the camera. However, for the object position calculator 606 to accurately determine the 3D position of an object, the object position calculator 606 relies on the 2D location of the object detected within multiple images captured by different cameras 104 at different angles along with the corresponding calibration matrices for the different cameras. That is, in some examples, the object position calculator 606 determines the 3D position of an object based on principles of triangulation based on the combination of the detected 2D locations of objects in different images converted to 3D spaced using the corresponding calibration matrices of the cameras 104 capturing the images. In some examples, the calibration matrices for the different cameras 104 are stored in the memory 612 for reference.

The 3D model generator 608 of the example of FIG. 6 generates a photo-realistic 3D model of the environment 102. In some examples, model generation includes processing the images captured by the cameras 104 with a segmentation process after a binarization process. In some examples, the segmentation process may also be performed locally at the separate cameras 104. As described above, the segmentation process serves to identify or classify pixels associated with the background from pixels associated with objects in the foreground. Once images have undergone the segmentation process, the 3D model generator 608 analyzes different ones of the segmented images in combination to generate a 3D point cloud of the environment 102 that includes the objects detected in the foreground through the segmentation process. Thereafter, the 3D model generator 608 textures or colors the 3D point cloud based on color pixel information from the different camera images to generate the final photo-realistic 3D model of the environment.

The model integrity analyzer 610 of this example compares the 3D model of the environment 102 generated by the 3D model generator 608 with the 3D position of detected objects as determined by the object position calculator 606 (based on an output of the AI-based object detection engine 604). The purpose of the model integrity analyzer 610 in making this comparison is to confirm the accuracy or integrity of the 3D model with respect to the real-world environment 102 and/or to identify potential errors that need correcting. As mentioned above, potential errors in the 3D model may include missing portions of objects, and/or duplicate portions of objects. As used herein, a portion of an object may include the entirety of the object. That is, in some examples, an error may include an object missing from the 3D model in its entirety and/or an object duplicated in its entirety within the 3D model.

It is unlikely that the 3D position of objects determined by the object position calculator 606 will exactly match the corresponding regions of the 3D model of the environment 102 generated by the 3D model generator 608. Accordingly, in some examples, the model integrity analyzer 610 quantifies differences between the 3D position of an object and the 3D model and then compares the quantified difference to a confidence threshold corresponding to a specified level of confidence that the 3D model contains an error that needs to be corrected. If the confidence threshold is satisfied, the model integrity analyzer 610 may determine the nature of the error (e.g., false positive and/or false negative) and how the 3D model needs to be corrected. For example, the model integrity analyzer 610 may determine that a player on the soccer field 108 is missing a leg in the 3D model with a threshold level of confidence. In some such examples, the 3D model generator 608 may generate a point cloud representation of the missing leg based on a model of the human body stored in the memory 612. In some examples, the 3D model generator 608 determines the particular shape of the leg (i.e., how the leg is positioned relative to the rest of the player's body) based on a skeletal model or human pose model of the player as determined by the AI-based object detection engine 604 and the object position calculator 606. In some examples, the particular shape of the leg may be determined based, in part, on an analysis of the captured images associated with previous frames of a video stream corresponding to the sporting event and/or an analysis of the 3D model generated based on the previous frames (including any corrections to the 3D model associated with the previous frames). After generating a suitable point cloud representation of the missing leg, the 3D model generator 608 may insert the point cloud representation into the 3D model and update the texturing or coloring of the modified 3D model to produce the final photo-realistic 3D model that includes the player's full body.

In situations where the model integrity analyzer 610 determines that the difference between the calculated 3D position of an object and the 3D model is the result of duplicative portions of the object, the model integrity analyzer 610 may determine what portion is duplicative. That is, if the 3D model indicates a player has two left legs, the model integrity analyzer 610 determines which of the two left legs corresponds to the actual leg of the player and which one is duplicative. In some examples, the model integrity analyzer 610 identifies the duplicative portion based on a skeletal or human pose model of the player as determined by the AI-based object detection engine 604 and the object position calculator 606. Once the duplicative portion of the player is identified, the 3D model generator 608 of FIG. 6 modifies the 3D model by removing the duplicative portion and recoloring the 3D model to produce the final photo-realistic model without the duplicative content.

While an example manner of implementing the image processing system 600 is illustrated in FIG. 6, one or more of the elements, processes and/or devices illustrated in FIG. 6 may be combined, divided, re-arranged, omitted, eliminated and/or implemented in any other way. Further, the example communications interface 602, the example AI-based object detection engine 604, the example object position calculator 606, the example 3D model generator 608, the example model integrity analyzer 610, the example memory 612, and/or, more generally, the example image processing system 600 of FIG. 6 may be implemented by hardware, software, firmware and/or any combination of hardware, software and/or firmware. Thus, for example, any of the example communications interface 602, the example AI-based object detection engine 604, the example object position calculator 606, the example 3D model generator 608, the example model integrity analyzer 610, the example memory 612 and/or, more generally, the example image processing system 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, at least one of the example communications interface 602, the example AI-based object detection engine 604, the example object position calculator 606, the example 3D model generator 608, the example model integrity analyzer 610, and/or the example memory 612 is/are hereby expressly defined to include a non-transitory computer readable storage device or storage disk such as a memory, a digital versatile disk (DVD), a compact disk (CD), a Blu-ray disk, etc. including the software and/or firmware. Further still, the example image processing system 600 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
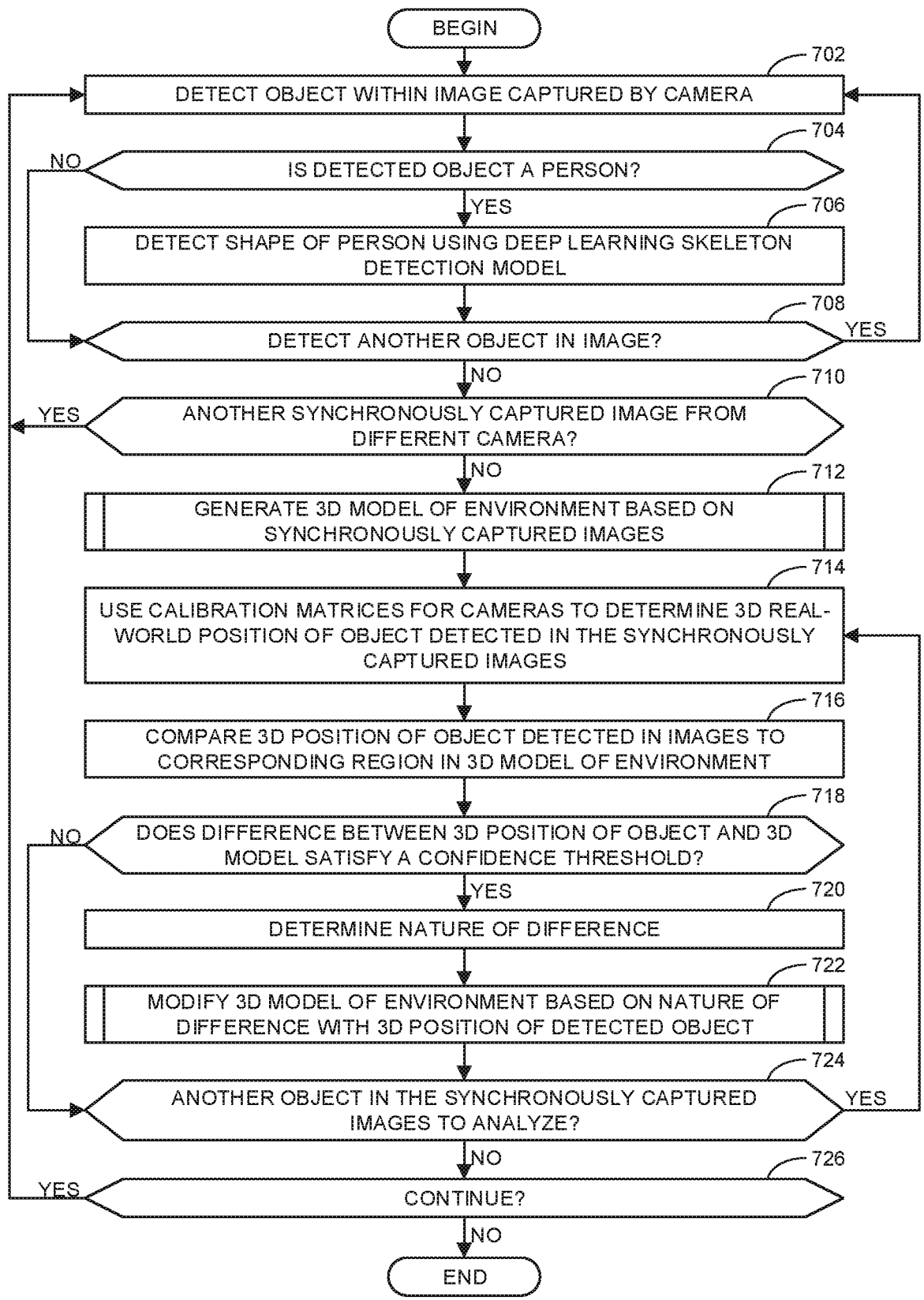
FIGS. 7-9 are flowcharts representative of machine readable instructions which may be executed to implement the example image processing system of FIG. 6.
Figure 8:
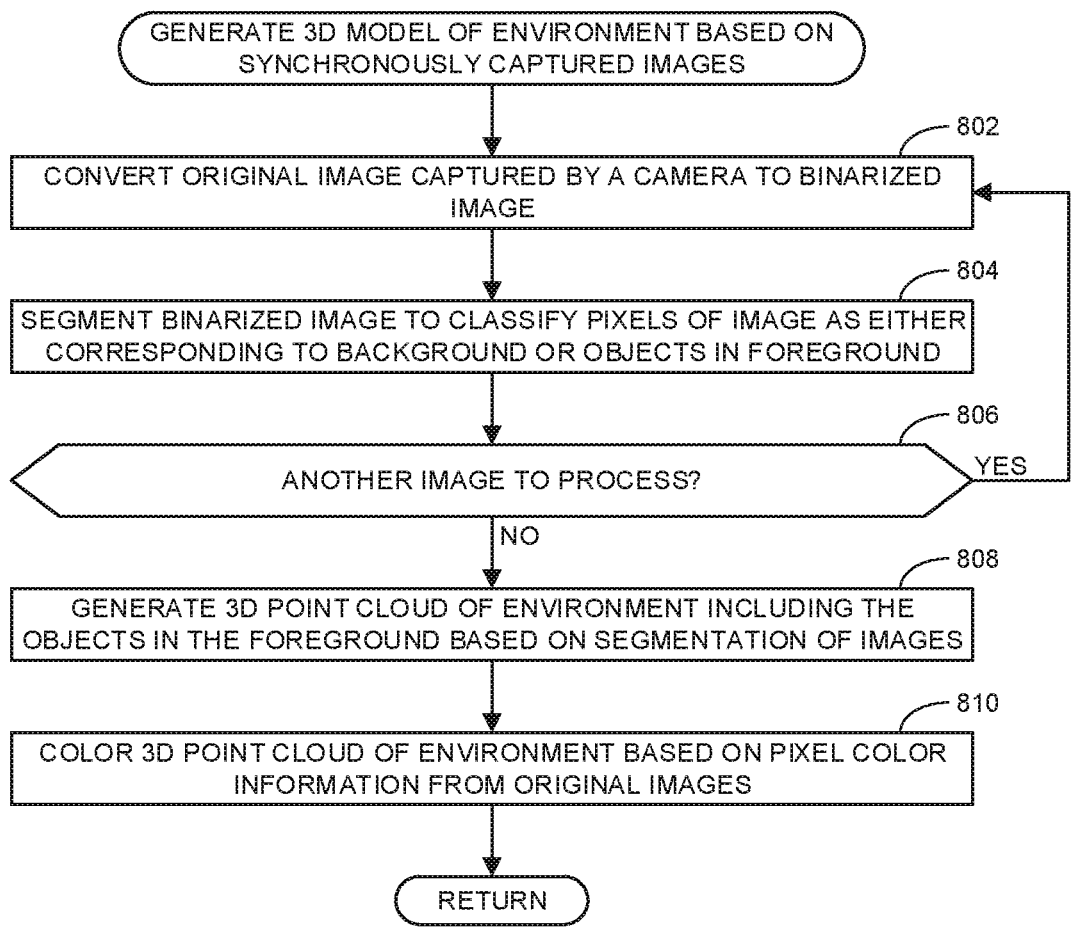
Figure 9:
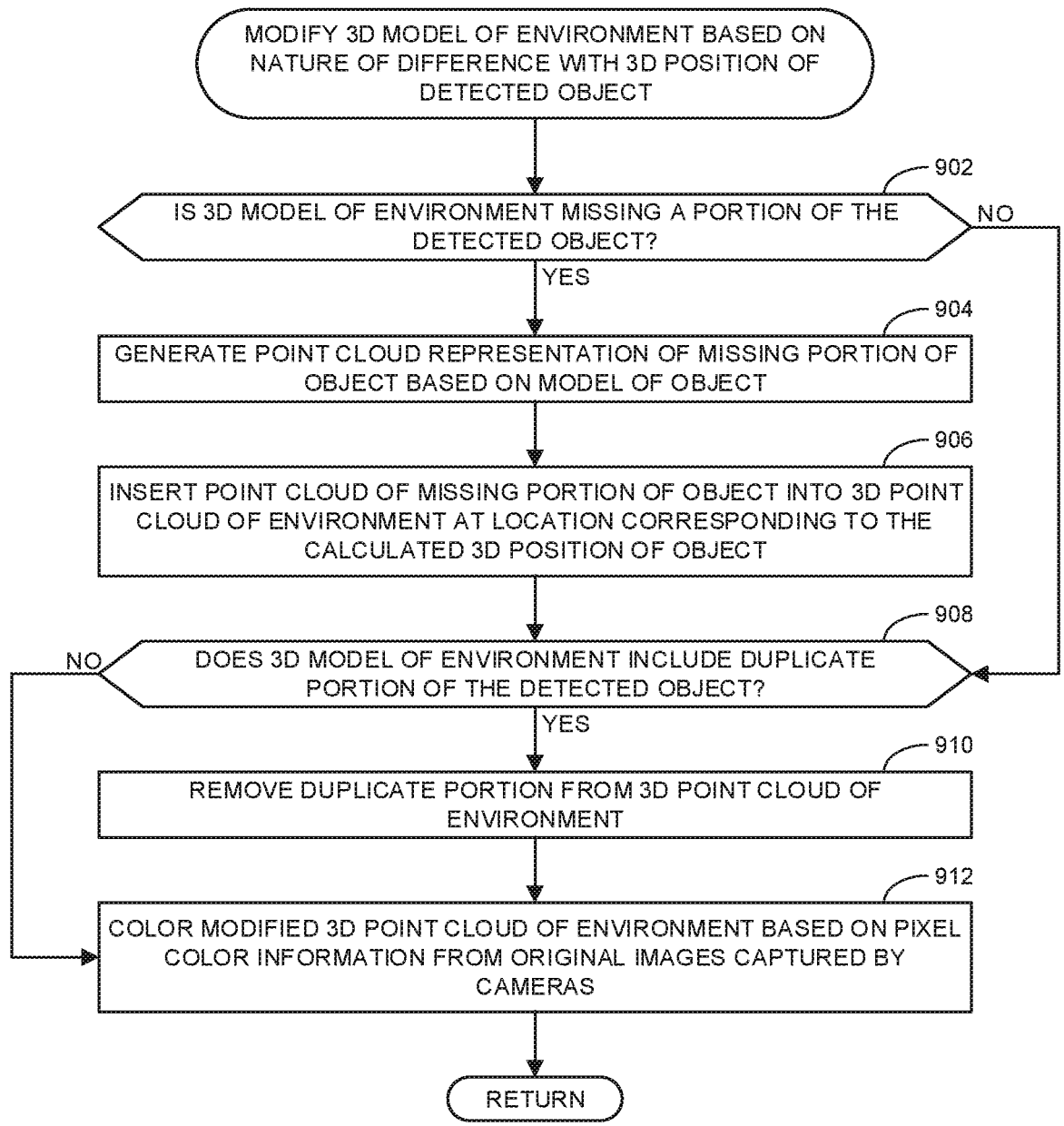

Flowcharts representative of example hardware logic, machine readable instructions, hardware implemented state machines, and/or any combination thereof for implementing the image processing system 600 of FIG. 6 is shown in FIGS. 7-9. The machine readable instructions may be an executable program or portion of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIG. 7-9, many other methods of implementing the example image processing system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program of FIG. 7 begins at block 702 where the example AI-based object detection engine 604 detects an object within an image captured by a camera 104. In some examples, the object is detected based on an analysis of the image itself. In some examples, the object is detected based on an analysis of the image as well as on an analysis of other images captured by the camera 104 associated previous frames in a video stream (e.g., analyzed during previous iterations of the example process of FIG. 7). At block 704, the example AI-based object detection engine 604 determines whether the detected object is a person. If so, control advances to block 706 where the example AI-based object detection engine 604 detects the shape of the person using a deep learning skeleton or human pose detection model. Thereafter, control advances to block 708. If the example AI-based object detection engine 604 determines that the detected object is not a person (block 704), control advances directly to block 708.

At block 708, the example AI-based object detection engine 604 determines whether to detect another object in the image. If so, control returns to block 702. Otherwise, the example process of FIG. 7 advances to block 710. At block 710, the example AI-based object detection engine 604 determines whether there is another synchronously captured image from a different camera 104 to be analyzed. If so, control returns to block 702. Otherwise, the example process of FIG. 7 advances to block 712.

At block 712, the example 3D model generator 608 generates a 3D model of the environment 102 based on the synchronously captured images. As represented in the illustrated example of FIG. 7, all images captured at the same point in time are processed by the example AI-based object detection engine 604 before advancing to the 3D model generation of block 712. However, in other examples, inasmuch as the 3D model generation is an independent process, in some examples, the block 712 may occur concurrently with blocks 702-712 of FIG. 7.

Further detail regarding the implementation of block 712 is provided in the example flowchart of FIG. 8. The example process of FIG. 8 begins at block 802 where the example 3D model generator 608 converts an original image captured by a camera to a binarized image. At block 804, the example 3D model generator 608 segments the binarized image to classify pixels of the image as either corresponding to the background or objects in the foreground. In some examples, the segmentation process (block 804) may be implementation without binarizing images. That is, in some examples, the binarization process (block 802) may be omitted. At block 806, the example 3D model generator 608 determined whether there is another image to process. If so, control returns to block 802. Otherwise, control advances to block 808 where the example 3D model generator 608 generates a 3D point cloud of the environment 102 including the objects in the foreground based on the segmentation of the images. At block 810, the example 3D model generator 608 colors the 3D point cloud of the environment 102 based on pixels color information from the original images. Thereafter, the example process of FIG. 8 ends and returns to complete the process of FIG. 7.

Returning to FIG. 7, after the example 3D model generator 608 generates the 3D model of the environment 102 (block 712), control advances to block 714. At block 714, the example object position calculator 606 used calibration matrices for the cameras 104 to determine the 3D real-world position of the object detected in the synchronously captured images. At block 716, the example model integrity analyzer 610 compares the 3D position of an object detected in the images to the corresponding region in the 3D model of the environment 102. At block 718, the example model integrity analyzer 610 determines whether a difference between the 3D position of the object and the 3D model satisfies a confidence threshold. If not, control advances directly to block 724 where the example model integrity analyzer 610 determines whether there is another object in the synchronously captured images to analyze. If so, control returns to block 714.

If the example model integrity analyzer 610 determines that the difference between the 3D position of the object and the 3D model does satisfy the confidence threshold (block 718), control advances to block 720 where the example model integrity analyzer 610 determines the nature of the difference. That is, the example model integrity analyzer 610 determines whether a portion of the object is missing and what portion is missing or whether a portion of the object is duplicative and what portion is duplicative. At block 722, the example 3D model generator 608 modifies the 3D model of the environment 102 based on the nature of the difference with the 3D position of the detected object.

Further detail regarding the implementation of block 722 is provided in the example flowchart of FIG. 9. The example process of FIG. 9 begins at block 902 where the example 3D model generator 608 determines whether the 3D model of the environment 102 is missing a portion of the detected object. If so, control advances to block 904 where the example 3D model generator 608 generates a point cloud representation of the missing portion of the object based on a model of the object. At block 906, the example 3D model generator 608 inserts the point cloud representation of the missing portion of the object into the 3D point cloud for the environment 102 at a location corresponding to the calculated 3D position of the object. Thereafter, control advances to block 908. Returning to block 902, if the example 3D model generator 608 determines that the 3D model of the environment 102 is not missing a portion of the object, control advances directly to block 908.

At block 908, the example 3D model generator 608 determines whether the 3D model of the environment 102 includes a duplicate portion of the detected object. At block 910, the example 3D model generator 608 removes the duplicate portion from the 3D point cloud of the environment 102. At block 912, the example 3D model generator 608 colors the modified 3D point cloud of the environment 102 based on color pixel information from the original images captured by the cameras 104. Thereafter, the example process of FIG. 9 ends and returns to complete the process of FIG. 7.

Returning to FIG. 7, after the example 3D model generator 608 modifies the 3D model of the environment 102 (block 722), control advances to block 724 to determine whether there is another object to analyze, as mentioned above. If there are no more objects in the synchronously captures images to analyze, control advances to block 726 to determine whether to continue. The example process may continue if the images being analyzed are part of a video stream. In such examples, the process would continue to analyze a subsequent set of synchronously captured images. Thus, if it is determined to continue, control returns to block 702 to repeat the process. Otherwise, the example process of FIG. 7 ends. As mentioned above, in some examples, the analysis resulting from one iteration of the example process of FIG. 7 may be used to facilitate the analysis of images during a subsequent iteration of the process.

Figure 10:
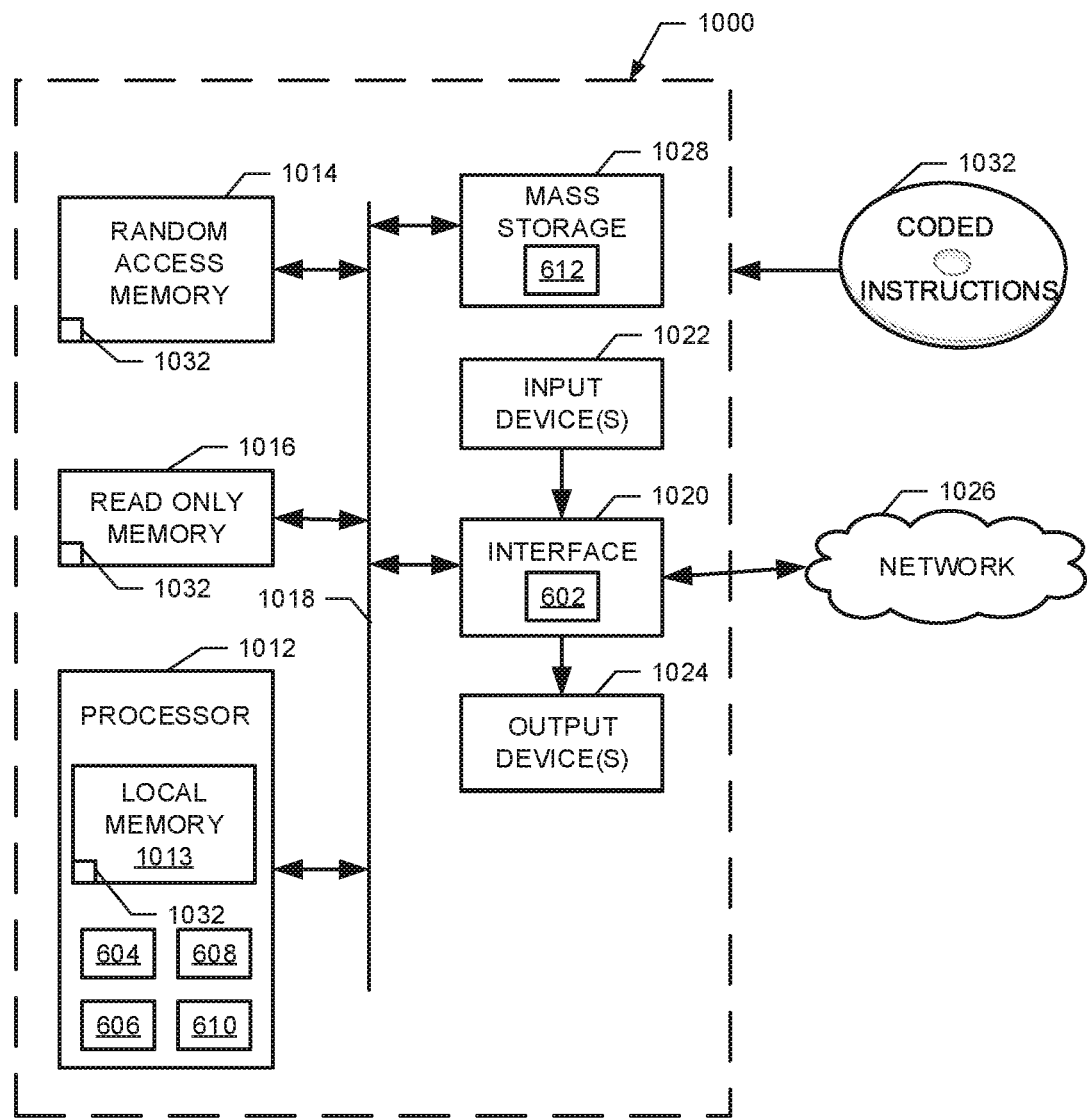
FIG. 10 is a block diagram of an example processing platform structured to execute the instructions of FIGS. 7, 8, and/or 9 to implement the example image processing system of FIGS. 1 and/or 6

FIG. 10 is a block diagram of an example processor platform 1000 structured to execute the instructions of FIGS. 7-9 to implement the image processing system 600 of FIG. 6. The processor platform 1000 can be, for example, a server, a personal computer, a workstation, a self-learning machine (e.g., a neural network), a mobile device (e.g., a cell phone, a smart phone, a tablet such as an iPad™), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example AI-based object detection engine 604, the example object position calculator 606, the example 3D model generator 608, and the example model integrity analyzer 610.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1040. The interface circuit 1040 may be implemented by any type of interface standard, such as an Ethernet interface, a universal serial bus (USB), a Bluetooth® interface, a near field communication (NFC) interface, and/or a PCI express interface. In this example, the interface 1040 implements the communications interface 602.

In the illustrated example, one or more input devices 1042 are connected to the interface circuit 1040. The input device(s) 1042 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1044 are also connected to the interface circuit 1040 of the illustrated example. The output devices 1044 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1040 of the illustrated example, thus, typically includes a graphics driver card, a graphics driver chip and/or a graphics driver processor.

The interface circuit 1040 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1046. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1048 for storing software and/or data. Examples of such mass storage devices 1048 include floppy disk drives, hard drive disks, compact disk drives, Blu-ray disk drives, redundant array of independent disks (RAID) systems, and digital versatile disk (DVD) drives.

The machine executable instructions 1022 of FIGS. 7-9 may be stored in the mass storage device 1048, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that automatically verify the accuracy of and/or automatically correct errors in a 3D model of an environment generated based on images analyzed using a segmentation process. Such error detection and correction are accomplished by an independent analysis of the images to detect objects within the images based on deep learning models and by determining the 3D position of the detected objects based on the calibration matrices for the cameras that captured the images and the corresponding 2D locations within the images where the objects were detected. This approach enables the generation of photo-realistic 3D models of an environment in a more efficient manner than other approaches that involve the manual editing of the model to add missing content and/or to remove duplicate content.

Furthermore, the process of detecting and tracking objects in an environment disclosed herein enables the segmentation process to be implemented with higher thresholds, thereby leading to increased accuracy and greater processor efficiency for the 3D model generation. Methods, apparatus and articles of manufacture disclosed herein are accordingly directed to one or more improvement(s) in the functioning of a computer.

Example 1 includes an apparatus comprising an object position calculator to determine a three-dimensional (3D) position of an object detected within a first image of an environment and within a second image of the environment, the first image captured by a first camera in a first location relative to the environment, the second image captured by a second camera in a second location relative to the environment different than the first location, a 3D model generator to generate a 3D model of the environment based on the first image and the second image, and a model integrity analyzer to detect a difference between the 3D position of the object and the 3D model, the 3D model generator to automatically modify the 3D model based on the difference.

Example 2 includes the apparatus as defined in example 1, wherein the 3D position of the object defines at least one of a placement, an orientation, or a shape of the object within a real-world 3D space corresponding to the environment.

Example 3 includes the apparatus as defined in any one of examples 1 or 2, wherein the 3D model generator is to generate the 3D model independently of the object position calculator determining the 3D position of the object.

Example 4 includes the apparatus as defined in any one of examples 1-3, further including an object detection engine to detect the object in the first image of the environment using a deep learning object detection model.

Example 5 includes the apparatus as defined in any one of examples 1, wherein, in response to the difference indicating a portion of the object is missing from the 3D model, the 3D model generator is to modify the 3D model by adding the missing portion.

Example 6 includes the apparatus as defined in example 5, wherein the missing portion corresponds to an entirety of the object.

Example 7 includes the apparatus as defined in any one of examples 5 or 6, wherein the 3D model generator is to add the missing portion by generating a point cloud representation of the missing portion based on a model of the object, positioning the point cloud representation of the missing portion within the 3D model at a location corresponding to the 3D position of the object, and coloring the point cloud representation of the missing portion based on pixel color information from at least one of the first image or the second image.

Example 8 includes the apparatus as defined in any one of examples 5-7, wherein the object corresponds to a person, the object position calculator is to determine the 3D position of the object by determining positions of body parts of the person based on a deep learning skeleton detection model, and the missing portion of the object corresponds to a missing body part of the person.

Example 9 includes the apparatus as defined in example 8, wherein the model integrity analyzer is to detect the difference between the position of the object and the 3D model by comparing the positions of the body parts of the person to a region of the 3D model corresponding to the 3D position of the object.

Example 10 includes the apparatus as defined in example 9, wherein the 3D model generator is to add the missing portion by generating a point cloud representation of the missing body part based on a model of a human, positioning the point cloud representation of the missing body part within the 3D model based on the skeleton detection model, and coloring the point cloud representation of the missing body part based on pixel color information from at least one of the first image or the second image.

Example 11 includes the apparatus as defined in any one of examples 1-10, wherein, in response to the model integrity analyzer determining that a region of the 3D model corresponding to the position of the object includes a duplicate portion of the object, the 3D model generator is to modify the 3D model by removing the duplicate portion.

Example 12 includes the apparatus as defined in any one of examples 1-11, wherein the first image is captured at a same time as the second image.

Example 13 includes the apparatus as defined in any one of examples 1-12, wherein the environment is associated with a sporting event and the object corresponds to at least one of a participant in the sporting event or sports equipment used in the sporting event.

Example 14 includes the apparatus as defined in any one of examples 1-13, wherein the environment corresponds to a playing field and the object corresponds to a ball used in a game played on the playing field.

Example 15 includes the apparatus as defined in any one of examples 1-14, wherein the 3D model generator is to automatically modify the 3D model in response to the difference satisfying a confidence threshold and to disregard the difference when the difference does not satisfy the confidence threshold.

Example 16 includes the apparatus as defined in any one of examples 1-15, wherein the object position calculator is to determine the 3D position of the object based on a first calibration matrix for the first camera and a second calibration matrix for the second camera.

Example 17 includes the apparatus as defined in any one of examples 1-16, wherein the first image is a first frame in a video stream captured by the first camera, the object position calculator to determine the 3D position of the object within the first image based on a previous image captured by the first camera before the first image, the previous image corresponding to a different frame in the video stream.

Example 18 includes a system comprising a first camera to capture a first image of an environment, the first camera in a first location relative to the environment, a second camera to capture a second image of the environment, the second camera in a second location different than the first location, at least one processor, and memory including instructions that, when executed by the at least one processor, cause the at least one processor to determine a three-dimensional (3D) position of an object detected within the first image and within the second image, generate a 3D model of the environment based on the first image and the second image, detect a difference between the 3D position of the object and the 3D model, and automatically modify the 3D model based on the difference.

Example 19 includes the system as defined in example 18, wherein the 3D position of the object defines at least one of a placement, an orientation, or a shape of the object within a real-world 3D space corresponding to the environment.

Example 20 includes the system as defined in any one of examples 18 or 19, wherein the instructions cause the at least one processor is to generate the 3D model independently of the at least one processor determining the 3D position of the object.

Example 21 includes the system as defined in any one of examples 18-20, wherein the instructions further cause the at least one processor to detect the object in the first image of the environment using a deep learning object detection model.

Example 22 includes the system as defined in any one of examples 18-21, wherein the instructions further cause the at least one processor to, in response to the difference indicating a portion of the object is missing from the 3D model, modify the 3D model by adding the missing portion.

Example 23 includes the system as defined in example 22, wherein the missing portion corresponds to an entirety of the object.

Example 24 includes the system as defined in any one of examples 22 or 23, wherein the instructions cause the at least one processor to add the missing portion by generating a point cloud representation of the missing portion based on a model of the object, positioning the point cloud representation of the missing portion within the 3D model at a location corresponding to the 3D position of the object, and coloring the point cloud representation of the missing portion based on pixel color information from at least one of the first image or the second image.

Example 25 includes the system as defined in any one of examples 22-24, wherein the object corresponds to a person, the instructions cause the at least one processor to determine the 3D position of the object by determining positions of body parts of the person based on a deep learning skeleton detection model, and the missing portion of the object corresponds to a missing body part of the person.

Example 26 includes the system as defined in example 25, wherein the instructions further cause the at least one processor to detect the difference between the position of the object and the 3D model by comparing the positions of the body parts of the person to a region of the 3D model corresponding to the 3D position of the object.

Example 27 includes the system as defined in example 26, wherein the instructions cause the at least one processor to add the missing body part by generating a point cloud representation of the missing body part based on a model of a human, positioning the point cloud representation of the missing body part within the 3D model based on the skeleton detection model, and coloring the point cloud representation of the missing body part based on pixel color information from at least one of the first image or the second image.

Example 28 includes the system as defined in any one of examples 18-27, wherein the instructions further cause the at least one processor to, in response to determining that a region of the 3D model corresponding to the position of the object includes a duplicate portion of the object, modify the 3D model by removing the duplicate portion.

Example 29 includes the system as defined in any one of examples 18-28, wherein the first camera is to capture the first image at a same time as the second camera is to capture the second image.

Example 30 includes the system as defined in example 18, wherein the environment is associated with a sporting event and the object corresponds to at least one of a participant in the sporting event or sports equipment used in the sporting event.

Example 31 includes the system as defined in any one of examples 18-30, wherein the environment corresponds to a playing field and the object corresponds to a ball used in a game played on the playing field.

Example 32 includes the system as defined in any one of examples 18-31, wherein the instructions cause the at least one processor to automatically modify the 3D model in response to the difference satisfying a confidence threshold and to disregard the difference when the difference does not satisfy the confidence threshold.

Example 33 includes the system as defined in any one of examples 18-32, wherein the instructions cause the at least one processor is to determine the 3D position of the object based on a first calibration matrix for the first camera and a second calibration matrix for the second camera.

Example 34 includes the system as defined in any one of examples 18-33, wherein the first image is a first frame in a video stream captured by the first camera, the instructions to cause the at least one processor is to determine the 3D position of the object within the first image based on a previous image captured by the first camera before the first image, the previous image corresponding to a different frame in the video stream.

Example 35 includes a non-transitory computer readable medium comprising instructions that, when executed, cause a machine to at least determine a three-dimensional (3D) position of an object detected within a first image of an environment and within a second image of the environment, the first image captured by a first camera in a first location relative to the environment, the second image captured by a second camera in a second location relative to the environment different than the first location, generate a 3D model of the environment based on the first image and the second image, detect a difference between the 3D position of the object and the 3D model, and automatically modify the 3D model based on the difference.

Example 36 includes the non-transitory computer readable medium as defined in example 35, wherein the 3D position of the object defines at least one of a placement, an orientation, or a shape of the object within a real-world 3D space corresponding to the environment.

Example 37 includes the non-transitory computer readable medium as defined in any one of examples 35 or 36, wherein the instructions further cause the machine to generate the 3D model independently of the machine determining the 3D position of the object.

Example 38 includes the non-transitory computer readable medium as defined in any one of examples 35-37, wherein the instructions further cause the machine to detect the object in the first image of the environment using a deep learning object detection model.

Example 39 includes the non-transitory computer readable medium as defined in any one of examples 35-38, wherein the instructions further cause the machine to, in response to the difference indicating a portion of the object is missing from the 3D model, modify the 3D model by adding the missing portion.

Example 40 includes the non-transitory computer readable medium as defined in example 39, wherein the missing portion corresponds to an entirety of the object.

Example 41 includes the non-transitory computer readable medium as defined in any one of examples 39 or 40, wherein the instructions further cause the machine to add the missing portion by generating a point cloud representation of the missing portion based on a model of the object, positioning the point cloud representation of the missing portion within the 3D model at a location corresponding to the 3D position of the object, and coloring the point cloud representation of the missing portion based on pixel color information from at least one of the first image or the second image.

Example 42 includes the non-transitory computer readable medium as defined in any one of examples 39-41, wherein the object corresponds to a person, the instructions further cause the machine to determine the 3D position of the object by determining positions of body parts of the person based on a deep learning skeleton detection model, and the missing portion of the object corresponds to a missing body part of the person.

Example 43 includes the non-transitory computer readable medium as defined in example 42, wherein the instructions further cause the machine to detect the difference between the position of the object and the 3D model by comparing the positions of the body parts of the person to a region of the 3D model corresponding to the 3D position of the object.

Example 44 includes the non-transitory computer readable medium as defined in example 43, wherein the instructions further cause the machine to add the missing body part by generating a point cloud representation of the missing body part based on a model of a human, positioning the point cloud representation of the missing body part within the 3D model based on the skeleton detection model, and coloring the point cloud representation of the missing body part based on pixel color information from at least one of the first image or the second image.

Example 45 includes the non-transitory computer readable medium as defined in any one of examples 35-44, wherein the instructions further cause the machine to, in response to determining that a region of the 3D model corresponding to the position of the object includes a duplicate portion of the object, modify the 3D model by removing the duplicate portion.

Example 46 includes the non-transitory computer readable medium as defined in any one of examples 35-45, wherein the first image is captured at a same time as the second image.

Example 47 includes the non-transitory computer readable medium as defined in any one of examples 35-46, wherein the environment is associated with a sporting event and the object corresponds to at least one of a participant in the sporting event or sports equipment used in the sporting event.

Example 48 includes the non-transitory computer readable medium as defined in any one of examples 35-47, wherein the environment corresponds to a playing field and the object corresponds to a ball used in a game played on the playing field.

Example 49 includes the non-transitory computer readable medium as defined in any one of examples 35-48, wherein the instructions further cause the machine to automatically modify the 3D model in response to the difference satisfying a confidence threshold and to disregard the difference when the difference does not satisfy the confidence threshold.

Example 50 includes the non-transitory computer readable medium as defined in any one of examples 35-49, wherein the instructions further cause the machine to determine the 3D position of the object based on a first calibration matrix for the first camera and a second calibration matrix for the second camera.

Example 51 includes the non-transitory computer readable medium as defined in any one of examples 35-50, wherein the first image is a first frame in a video stream captured by the first camera, the instructions to cause the machine to determine the 3D position of the object within the first image based on a previous image captured by the first camera before the first image, the previous image corresponding to a different frame in the video stream.

Example 52 includes a method comprising determining, by executing an instruction with at least one processor, a three-dimensional (3D) position of an object detected within a first image of an environment and within a second image of the environment, the first image captured by a first camera in a first location relative to the environment, the second image captured by a second camera in a second location relative to the environment different than the first location, generating, by executing an instruction with the at least one processor, a 3D model of the environment based on the first image and the second image, detecting, by executing an instruction with the at least one processor, a difference between the 3D position of the object and the 3D model, and automatically modifying, by executing an instruction with the at least one processor, the 3D model based on the difference.

Example 53 includes the method as defined in example 52, further including generating the 3D model independently of determining the 3D position of the object.

Example 54 includes the method as defined in any one of examples 52 or 53, further including detecting the object in the first image of the environment using a deep learning object detection model.

Example 55 includes the method as defined in any one of examples 52-54, further including, in response to the difference indicating a portion of the object is missing from the 3D model, modifying the 3D model by adding the missing portion.

Example 56 includes the method as defined in example 55, wherein the adding of the missing portion includes generating a point cloud representation of the missing portion based on a model of the object, positioning the point cloud representation of the missing portion within the 3D model at a location corresponding to the 3D position of the object, and coloring the point cloud representation of the missing portion based on pixel color information from at least one of the first image or the second image.

Example 57 includes the method as defined in any one of examples 55 or 56, wherein the object corresponds to a person, the determining of the position of the object includes determining positions of body parts of the person based on a deep learning skeleton detection model, and the missing portion of the object corresponds to a missing body part of the person.

Example 58 includes the method as defined in example 57, further including detecting the difference between the position of the object and the 3D model by comparing the positions of the body parts of the person to a region of the 3D model corresponding to the 3D position of the object.

Example 59 includes the method as defined in example 58, wherein the adding of the missing body part includes generating a point cloud representation of the missing body part based on a model of a human, positioning the point cloud representation of the missing body part within the 3D model based on the skeleton detection model, and coloring the point cloud representation of the missing body part based on pixel color information from at least one of the first image or the second image.

Example 60 includes the method as defined in any one of examples 52-59, further including, in response to determining that a region of the 3D model corresponding to the position of the object includes a duplicate portion of the object, modifying the 3D model by removing the duplicate portion.

Example 61 includes the method as defined in any one of examples 52-60, wherein the first image is captured at a same time as the second image.

Example 62 includes the method as defined in any one of examples 52-61, wherein the environment is associated with a sporting event and the object corresponds to at least one of a participant in the sporting event or sports equipment used in the sporting event.

Example 63 includes the method as defined in any one of examples 52-62, wherein the environment corresponds to a playing field and the object corresponds to a ball used in a game played on the playing field.

Example 64 includes the method as defined in any one of examples 52-63, further including automatically modifying the 3D model in response to the difference satisfying a confidence threshold disregarding the difference when the difference does not satisfy the confidence threshold.

Example 65 includes the method as defined in any one of examples 52-64, further including determining the 3D position of the object based on a first calibration matrix for the first camera and a second calibration matrix for the second camera.

Example 66 includes the method as defined in any one of examples 52-65, wherein the first image is a first frame in a video stream captured by the first camera, the method further including determining the 3D position of the object within the first image based on a previous image captured by the first camera before the first image, the previous image corresponding to a different frame in the video stream.

Example 67 includes a non-transitory computer readable medium comprising instructions that, when executed, causes a machine to at least perform the methods of any one of examples 52-66.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   instructions;
   processor circuitry to execute the instructions to:
      determine a three-dimensional (3D) position of an object detected within a first image of an environment and within a second image of the environment, the 3D position defined relative to a real-world 3D space corresponding to the environment in which the object is located, the first image captured by a first camera in a first location relative to the environment, the second image captured by a second camera in a second location relative to the environment different than the first location;
      generate a 3D model of the environment and the object based on the first image and the second image;
      detect a difference between the 3D position of the object and the 3D model;
      determine a level of confidence that the 3D model contains an error based on the difference;
      in response to the level of confidence satisfying a threshold value, determine a nature of the difference, the nature of the difference to distinguish between when the 3D model is generated with a missing portion of the object and when the 3D model is generated with a duplicative portion of the object; and
      automatically modify the 3D model based on the determined nature of the difference by adding the missing portion of the object or removing the duplicative portion of the object.

2. The apparatus as defined in claim 1, wherein the 3D position of the object defines at least one of a placement, an orientation, or a shape of the object within the real-world 3D space corresponding to the environment.

3. The apparatus as defined in claim 1, wherein the processor circuitry is to execute the instructions to generate the 3D model independently of determining the 3D position of the object.

4. The apparatus as defined in claim 1, wherein the object in the first image of the environment is detected using a deep learning object detection model.

5. The apparatus as defined in claim 1, wherein the missing portion corresponds to an entirety of the object.

6. The apparatus as defined in claim 1, wherein the processor circuitry is to execute the instructions to add the missing portion by:
   generating a point cloud representation of the missing portion based on a model of the object;
   positioning the point cloud representation of the missing portion within the 3D model at a location corresponding to the 3D position of the object; and
   coloring the point cloud representation of the missing portion based on pixel color information from at least one of the first image or the second image.

7. The apparatus as defined in claim 1, wherein the object corresponds to a person, the processor circuitry is to execute the instructions to determine the 3D position of the object by determining positions of body parts of the person based on a deep learning skeleton detection model, and the missing portion of the object corresponds to a missing body part of the person.

8. The apparatus as defined in claim 1, wherein the first image is captured at a same time as the second image.

9. The apparatus as defined in claim 1, wherein the processor circuitry is to execute the instructions to disregard the difference when the level of confidence does not satisfy the threshold value.

10. The apparatus as defined in claim 1, wherein the processor circuitry is to execute the instructions to determine the 3D position of the object based on a first calibration matrix for the first camera and a second calibration matrix for the second camera.

11. The apparatus as defined in claim 1, wherein the first image is a first frame in a video stream captured by the first camera, and the processor circuitry is to execute the instructions to determine the 3D position of the object within the first image based on a previous image captured by the first camera before the first image, the previous image corresponding to a different frame in the video stream.

12. The apparatus as defined in claim 1, wherein the object is a foreground object, the environment includes background objects distinct from the foreground object, and the 3D model includes the background objects.

13. The apparatus as defined in claim 1, wherein the processor circuitry is to further execute the instructions to:
   segment a plurality of pixels of the first image and of the second image into one or more of background pixels or foreground pixels, the object including ones of the plurality of pixels segmented into the foreground pixels; and
   generate the 3D model based on ones of the plurality of pixels segmented into the background pixels.

14. A system comprising:
   a first camera to capture a first image of an environment, the first camera in a first location relative to the environment;

a second camera to capture a second image of the environment, the second camera in a second location different than the first location;

at least one processor; and memory including instructions that, when executed by the at least one processor, cause the at least one processor to:

determine a three-dimensional (3D) position of an object detected within the first image and within the second image, the 3D position defined relative to a real-world 3D space corresponding to the environment, the object to be within the environment;

generate a 3D model of the environment, including the object, based on the first image and the second image;

detect a difference between the 3D position of the object and the 3D model;

determine a level of confidence that the 3D model contains an error based on the difference;

in response to the level of confidence satisfying a threshold value, determine a nature of the difference, the nature of the difference to distinguish between when the 3D model is generated with a missing portion of the object and when the 3D model is generated with a duplicative portion of the object; and automatically modify the 3D model based on the determined nature of the difference by adding the missing portion of the object or removing the duplicative portion of the object.

15. The system as defined in claim 14, wherein the instructions cause the at least one processor to generate the 3D model independently of the at least one processor determining the 3D position of the object.

16. The system as defined in claim 14, wherein the instructions cause the at least one processor to add the missing portion by:

generating a point cloud representation of the missing portion based on a model of the object;

positioning the point cloud representation of the missing portion within the 3D model at a location corresponding to the 3D position of the object; and coloring the point cloud representation of the missing portion based on pixel color information from at least one of the first image or the second image.

17. A non-transitory computer readable medium comprising instructions that, when executed, cause a machine to at least:

determine a three-dimensional (3D) position of an object detected within a first image of an environment and within a second image of the environment, the 3D position defined relative to a real-world 3D space corresponding to the environment in which the object is located, the first image captured by a first camera in a first location relative to the environment, the second image captured by a second camera in a second location relative to the environment different than the first location;

generate a 3D model of the object and the environment surrounding the object based on the first image and the second image;

detect a difference between the 3D position of the object and the 3D model;

determine a level of confidence that the 3D model contains an error based on the difference;

in response to the level of confidence satisfying a threshold value, determine a nature of the difference, the nature of the difference to distinguish between when the 3D model is generated with a missing portion of the object and when the 3D model is generated with a duplicative portion of the object; and automatically modify the 3D model based on the determined nature of the difference by adding the missing portion of the object or removing the duplicative portion of the object.

18. The non-transitory computer readable medium as defined in claim 17, wherein the instructions further cause the machine to generate the 3D model independently of the machine determining the 3D position of the object.

19. A method comprising:

determining, by executing an instruction with at least one processor, a three-dimensional (3D) position of an object detected within a first image of an environment and within a second image of the environment, the 3D position defined relative to a real-world 3D space corresponding to the environment, the environment containing the object, the first image captured by a first camera in a first location relative to the environment, the second image captured by a second camera in a second location relative to the environment different than the first location;

generating, by executing an instruction with the at least one processor, a 3D model of the environment based on the first image and the second image, the 3D model including the object;

detecting, by executing an instruction with the at least one processor, a difference between the 3D position of the object and the 3D model;

determining a level of confidence that the 3D model contains an error based on the difference;

in response to the level of confidence satisfying a threshold value, determining a nature of the difference, the nature of the difference to distinguish between when the 3D model is generated with a missing portion of the object and when the 3D model is generated with a duplicative portion of the object; and automatically modifying, by executing an instruction with the at least one processor, the 3D model based on the determined nature of the difference by adding the missing portion of the object or removing the duplicative portion of the object.

* * * * *